US006341946B1

United States Patent
Kelley

(12) United States Patent
(10) Patent No.: US 6,341,946 B1
(45) Date of Patent: Jan. 29, 2002

(54) CONTINUOUSLY ADJUSTABLE TELESCOPIC PEDAL CRANK LENGTH

(75) Inventor: John Falk Kelley, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/332,024

(22) Filed: Jun. 14, 1999

(51) Int. Cl.[7] .................................................. F04B 49/00
(52) U.S. Cl. ........................ 417/218; 417/221; 74/594.1; 74/594.3
(58) Field of Search ................................. 417/218, 221; 74/594.1, 594.2, 594.3

(56) References Cited

U.S. PATENT DOCUMENTS

| 516,137 A | * | 3/1894 | Tyler | 74/594.3 |
|---|---|---|---|---|
| 641,728 A | * | 1/1900 | Robinson | 74/594.3 |
| 3,789,696 A | * | 2/1974 | Beam, III | 74/594.1 |
| 3,888,136 A | * | 6/1975 | Lapeyre | 74/594.1 |
| 4,125,239 A | * | 11/1978 | Berclaz et al. | 248/69 |
| 4,446,754 A | * | 5/1984 | Chattin | 74/594.3 |
| 4,519,271 A | * | 5/1985 | Chattin | 74/594.3 |
| 4,706,516 A | * | 11/1987 | Xi | 74/594.1 |
| 4,807,491 A | * | 2/1989 | Stuckenbrok | 74/594.1 |
| 4,882,945 A | * | 11/1989 | Trevizo | 74/594.3 |
| 4,960,013 A | * | 10/1990 | Sander | 74/594.3 |
| 5,207,119 A | * | 5/1993 | Garneau | 74/594.3 |
| 5,566,590 A | * | 10/1996 | Wan | 74/594.3 |
| 6,152,471 A | * | 11/2000 | Kang et al. | 74/594.3 |

* cited by examiner

*Primary Examiner*—Cheryl J Tyler
(74) *Attorney, Agent, or Firm*—Stephan C. Kaufman, Esq.; McGinn & Gibb, PLLC

(57) ABSTRACT

A apparatus for gearless shifting, includes at least one crank, and an arm assembly, coupled to the at least one crank, for telescoping to adjust a length of the at least one crank, to selectively and controllably adjust a stroke length of the at least one crank. A pump also is provided including a variable-stroke length apparatus.

9 Claims, 5 Drawing Sheets

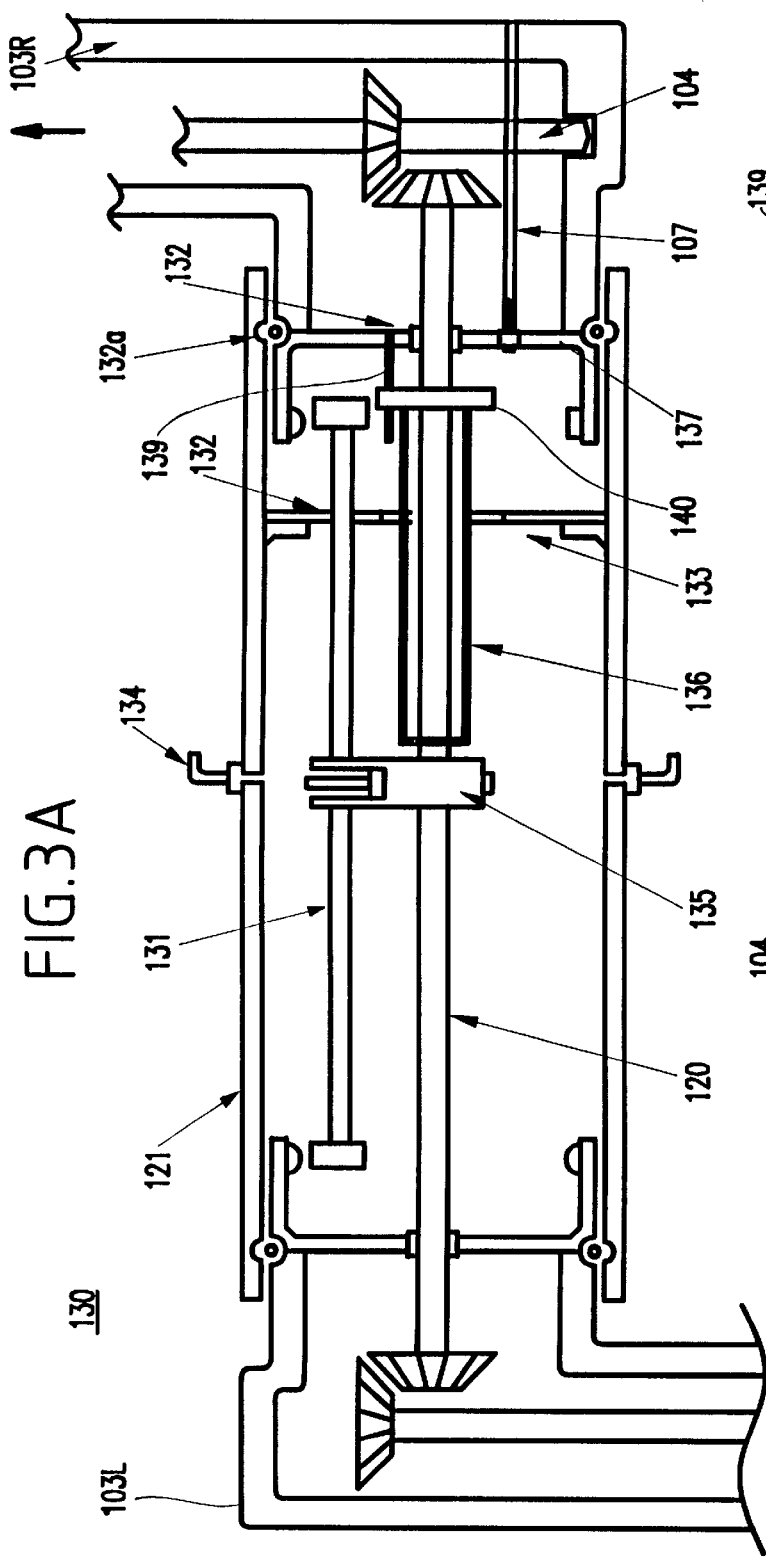
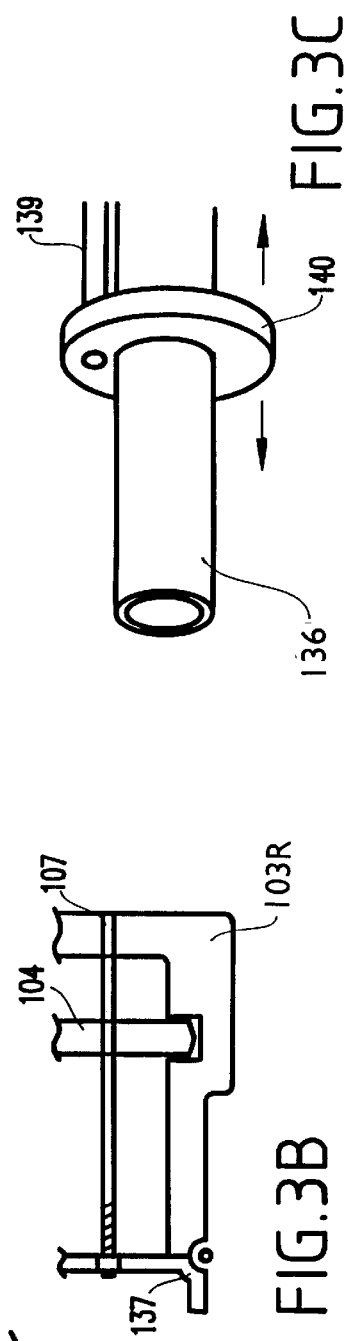

CONTINUOUSLY ADJUSTABLE TELESCOPIC PEDAL CRANK LENGTH

BACKGROUND OF THE INVENTION

1. Field of the Invention

The present invention generally relates to gear systems and derraileurs for mechanical systems such as bicycles, unicycles, reciprocating engines, reciprocating air pumps, other devices in which varying amounts of pressure are applied thereto, etc.), and more specifically to adjustable variable length bicycle/unicycle pedal crank for gearless shifting.

2. Description of the Related Art

Conventional systems utilize gear systems that are mechanically complex, vulnerable to damage and difficult to adjust and maintain. Additionally, in the case of bicycles, for messengers and other professionals who rely on manually-operated, wheeled vehicles such as bicycles, fancy gear mechanisms increase the attractiveness to thieves and the possibility of theft. It is noted that in bicycle applications the user is a cybernetic factor who determines how much stroke the user desires depending on the load to the user's legs.

However, despite occasional fads like "Scorchers" (e.g., one-speed bikes with no coast mechanism), one-speed bicycles have limited utility. The pedal-towheel rotation ratio on a one-speed bicycle must be optimized for slow speeds and traveling up-hill. When the speed increases and the legs move in the full pedal circle at high speeds, ergonomic efficiency drops dramatically. This has been problematic in the past, and thus has limited one-speed cycles' popularity.

Similarly for air pumps, a long-stroke pump may be needed for high volume, low pressure applications such as for an air mattress, whereas a short-stroke pump may be required for low volume, high pressure applications such as for a tire. This is inconvenient and no efficient, dual-purpose pump for applying varying amounts of pressure has been provided hitherto the invention.

SUMMARY OF THE INVENTION

In view of the foregoing problems of the conventional structures, an object of the present invention is to provide, in the case of a bicycle application, a structure for providing a real-time, continuous adjustability to the stroke length of the pedal crank, regardless of low speeds or high speeds of the bicycle.

In a first aspect, an apparatus for gearless shifting, includes a pedal crank; and a pedal arm assembly for telescoping to adjust a length of the pedal crank, to continuously adjust a stroke length of the pedal crank.

With the invention, at low speeds (e.g., low in regard to the desired application), the pedal cranks are fully extended, and maximum leverage is provided for climbing hills and initial pedaling.

At higher speeds, the stroke length can be shortened so that minimal leg motions can be used to continue to apply accelerative force to the drive wheel(s).

When the rider engages the "up" cog, a planetary gear (e.g., the drive gear 106 described below) in the pedal crank hub shifts into place which turns an internal shaft which screws the pedal arm into a shortened position.

Likewise, engaging the "down" cog, the internal shaft screws the pedal arm into a lengthened position. Both changes are driven by rotations of the pedal arm assembly (e.g., pedal-powered shifting). Pedal arms are connected together in the hub so that they will extend or shorten in parallel fashion.

The present invention is also applicable to an air pump, and indeed will find great benefit therein. Such an air pump preferably includes a motor, a piston driven by the motor, a cylinder coupled to the piston, and a variable stroke-length apparatus, coupled between the cylinder and the piston, for selectively and controllably adjusting a stroke length of the cylinder.

Thus, with the unique and unobvious features of the invention, a real-time, continuous adjustability to the stroke length of the crank (e.g., pedal crank in the bicycle application) can be provided, regardless of low speeds or high speeds of the bicycle. Further, an air pump may be similarly adjusted.

BRIEF DESCRIPTION OF THE DRAWINGS

The foregoing and other objects, aspects and advantages will be better understood from the following detailed description of a preferred embodiment of the invention with reference to the drawings, in which:

FIG. 3A is a schematic diagram of a crank tube assembly 130 according to the present invention;

FIG. 3B illustrates details of a screw 107 fitted between a pedal arm 103 through an adjustor shaft 104, and into a pedal arm cap 137;

FIG. 3C illustrates details of a pin 139 for being received into a wheel 140 of a shift stopper 136.

DETAILED DESCRIPTION OF PREFERRED EMBODIMENTS OF THE INVENTION

Figure 1:
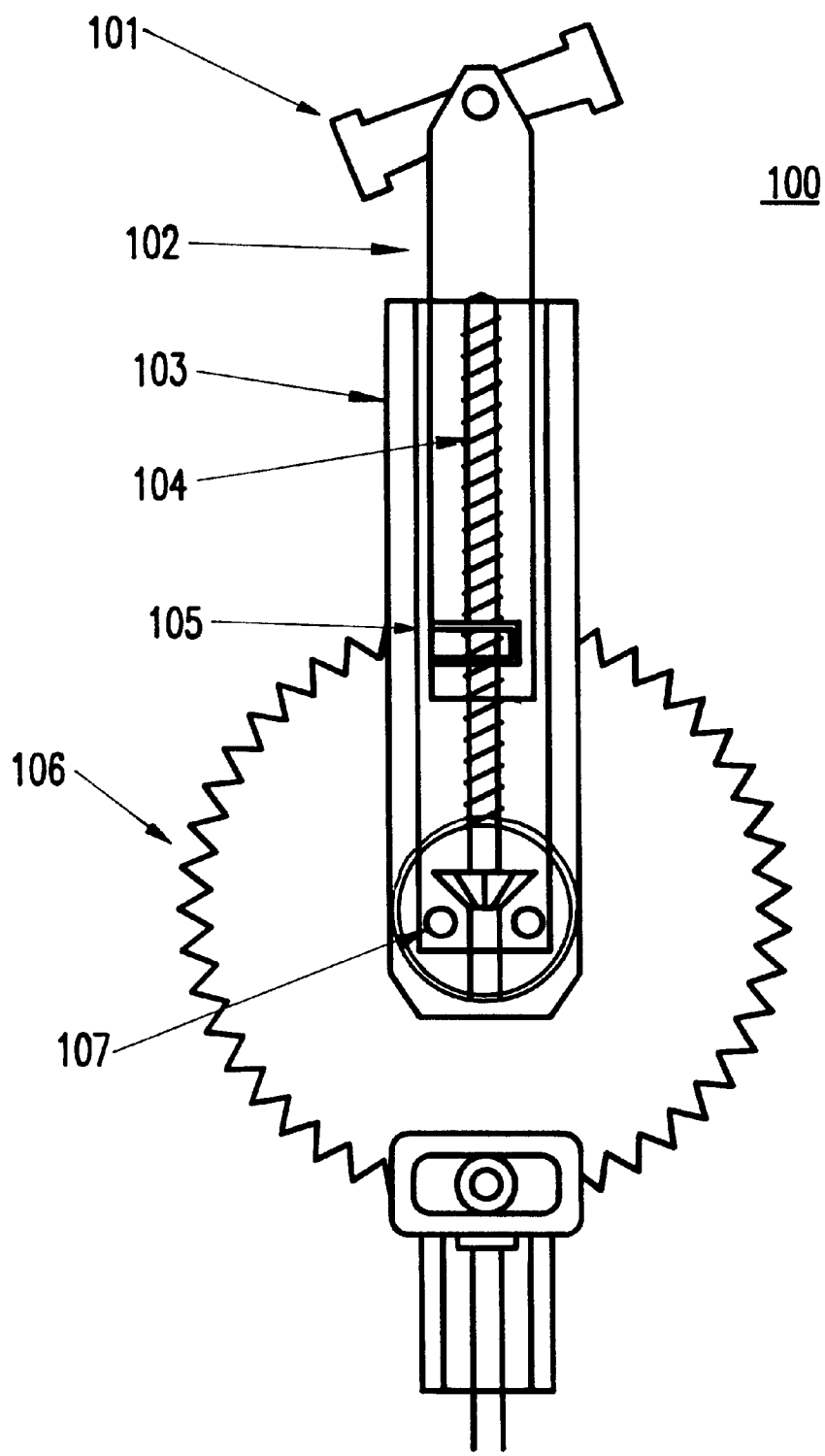
FIG. 1 illustrates a side view of a pedal arm assembly 100 according to a preferred embodiment of the present invention.

Referring now to the drawings, and more particularly to FIGS. 1–6, first and second preferred embodiments of the structure of the present invention are shown.

First Embodiment

Referring to FIG. 1, a pedal arm assembly 100 is shown which can telescope (e.g., extend) to adjust a length of a pedal crank, and thereby provide a real-time, continuous adjustability to the stroke length of the pedal crank. It is noted that like elements throughout the drawings are shown with the same reference numeral for clarity and ease of understanding. It is noted that only one pedal arm assembly is shown, even though two such assemblies are respectively provided for the left and right pedals.

The pedal arm assembly 100 includes a pedal 101, an inner pedal arm 102, a pedal arm 103 (left and right pedal arms for left and right pedals), an adjustor shaft 104, a trapped nut 105, a driver gear 106, and a screw 107.

In the pedal arm assembly, the adjustor shaft 104 turns against the trapped nut 105 in the inner pedal arm 102 to lengthen or shorten the stroke length. The adjustor shaft 104 is constrained by the trapped nut 105 and by a ball-in-socket junction at the base of the pedal arm (not shown).

The bottom portion of FIG. 1 illustrates a view of the pedal arm assembly from above.

Figure 2:
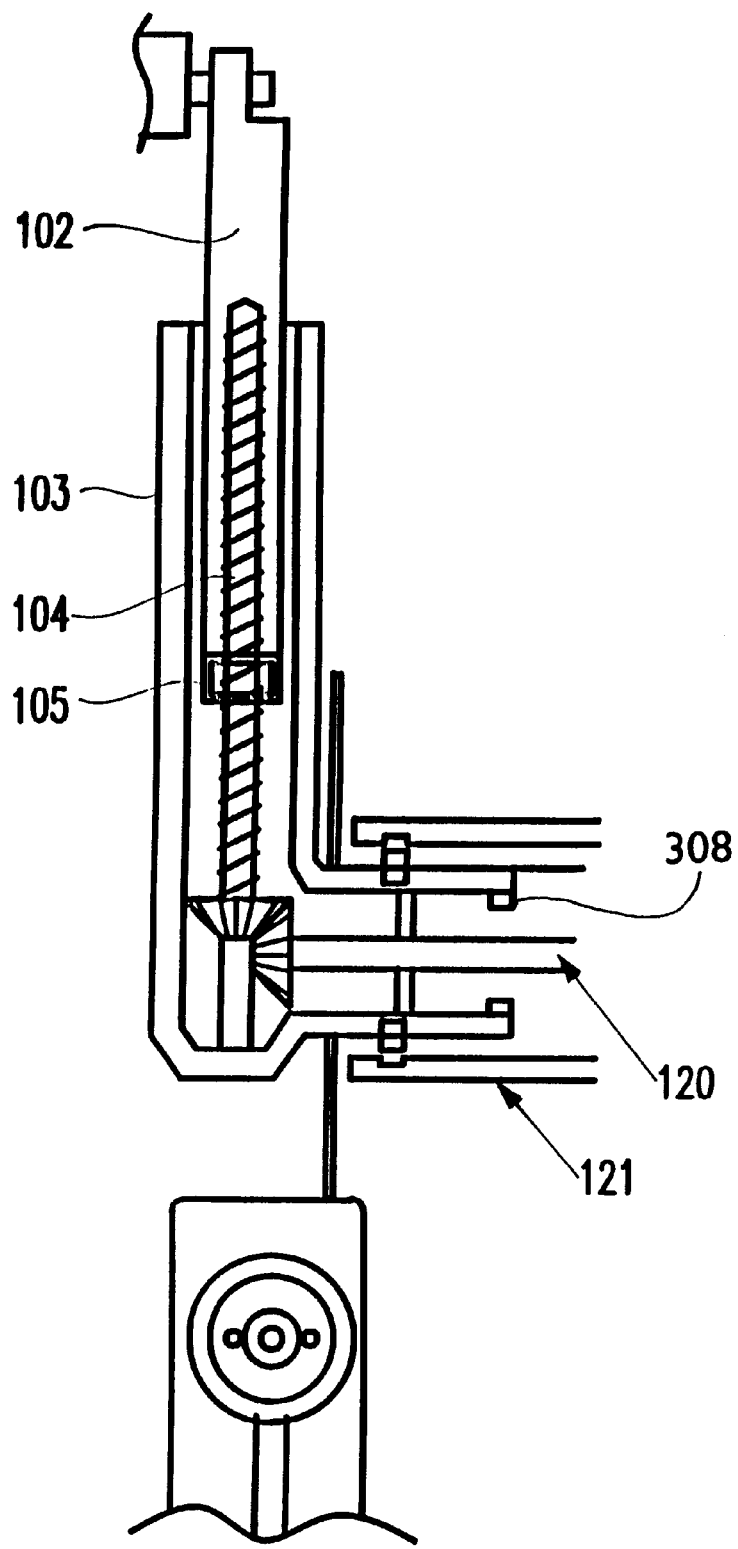
FIG. 2 is a schematic diagram of a front view of the pedal arm assembly 100.

In FIG. 2, which is a front view of the pedal arm assembly 100, the adjustor shafts 104 of the right and left pedal arm assemblies are linked together (e.g., via beveled gears) using the adjustor sync shaft 120, which extends through the tube 121, so that the pedal arm assemblies 100 always turn (e.g., lengthen or shorten) one way or the other in unison. Thus, each lengthens simultaneously and each shortens simultaneously.

The adjustor sync shaft 120 is constrained (e.g., held in place) by right and left sleeve bearings. The sleeve bearings are part of the right and left pedal arm caps 308. The lower portion of FIG. 2 illustrates a view from a crank tube 121. It is noted that when the shift stoppers (e.g., left and right) move together. Each moves until they abut the stop to disengage.

As illustrated in FIG. 3A, a crank tube assembly 130 is shown in which the right and left pedal arm assemblies 100 are linked together via a drive shaft 131 in the crank tube 121 (e.g., the crank tube is the same tube as shown in FIG. 2), so that the assemblies 100 always rotate (e.g., by pedaling) in unison.

The pedal arm assembly 100 is attached to the tube 120 via a ring bearing 132a. The drive shaft 131 is constrained by bearings 132 which are part of the drive shaft bearing bracket 133 (e.g., for convenience, only the right bracket is shown).

Under normal pedaling, the pedal arms 103R, 103L (e.g., right and left pedal arms linked by the drive shaft 131) rotate at the same rate as the adjustor sync shaft 120 which, therefore, induces no rotational force against the adjustor shafts 104, so that the stroke length remains constant. As also shown in FIG. 3A, the crank tube assembly includes a shifter cam 135 (described in further detail below), a shift stopper 136, and a pedal arm can 137 for holding the ring bearing in place. The pedal arm cap 137 also holds the sleeve bearing and a pivot pin 139 for the shift stopper 136. The pivot pin 139 is fitted into a wheel 140 fitted to adjustor sync shaft 120.

For completeness in FIG. 3A, the second (left) pedal assembly 103L is shown as is the second (left) shift stopper.

FIG. 3B illustrates a detailed view of the screw 107 fitted between the pedal arm 103R through the adjustor shaft 104, and into the pedal arm cap 137.

FIG. 3C illustrates the details of the pin 139 for being received into the wheel 140 of the shift stopper 136.

Figure 4:
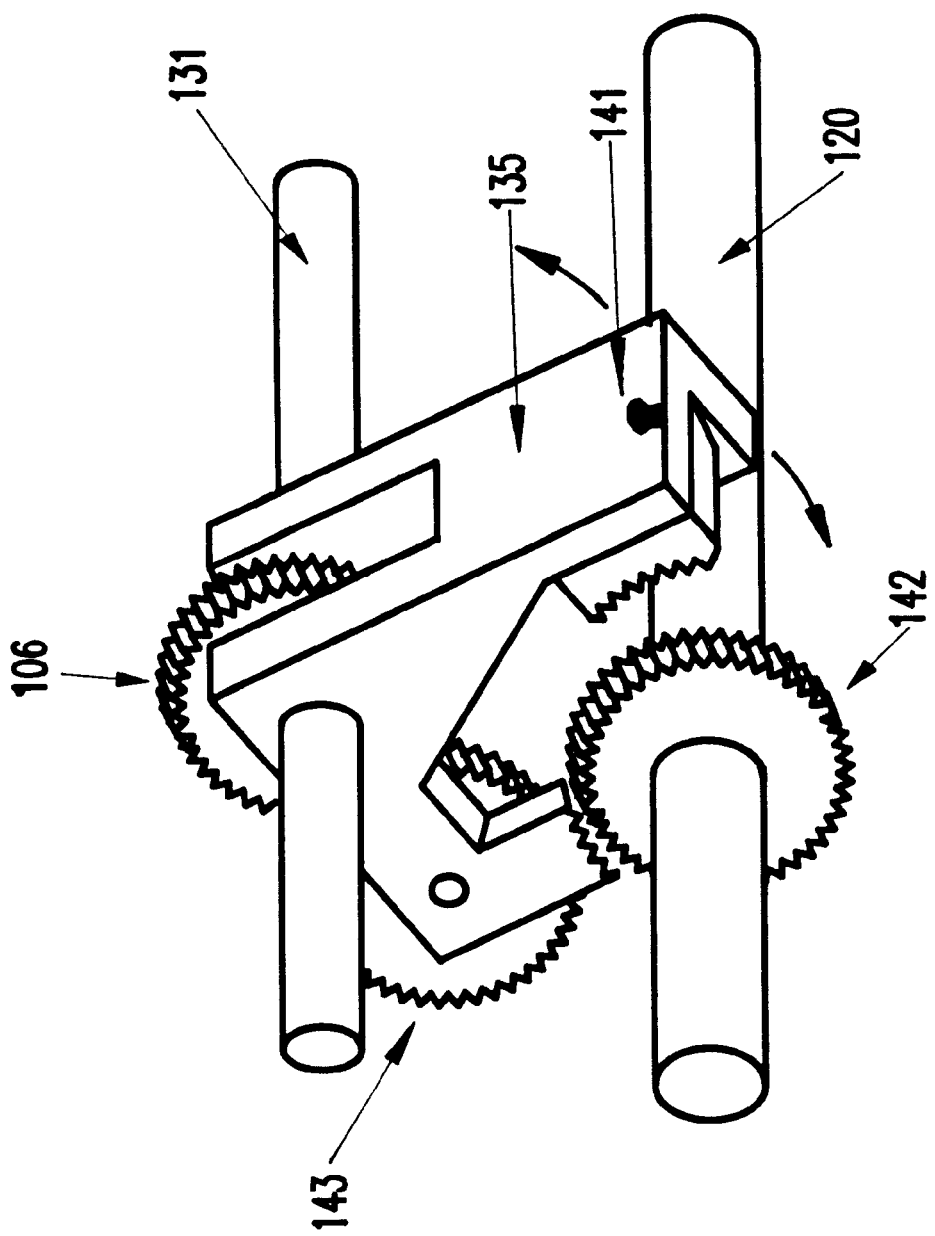
FIG. 4 is a schematic diagram of a shifter cam 135 in the crank tube assembly 130 of the present invention.

In FIG. 4, the construction and environment of the shifter cam 135 is shown in greater detail. The shifter cam 135 is used in cooperation with, a cable attachment point 141, a sync gear 142, and a pivot gear 143.

When cables (e.g., which enter the tube 121 via the cable ports 134 ) are pulled one way or the other, such pulling causes the shifter cam 135 to engage a sync gear 142 (e.g., which is fixed on the adjustor sync shaft 120). When the shifter cam 135 is pulled upwards, the pivot gear 143 engages the sync gear 142, thereby causing the adjustor sync shaft 120 to rotate relative to the pedal arms 103L, 103R, in the same direction that the pedal arms 103L, 103R are rotating. Thus, one cable (e.g., for "up") lengthens the stroke whereas the other cable (e.g., for "down") shortens the stroke.

As a result, a net rotation of the adjustor shafts 104 lengthens the stroke (e.g., extends the pedal arm assembly 100).

Then, the shifter cam 135 is pulled downwardly, and the fixed teeth (e.g., not referenced) on the shifter cam 135 engage the sync gear 142, causing the sync gear 142 to stop rotating. As a result of this operation, the adjustor sync shaft 120 is caused to rotate relative to the pedal arms 103L, 103R in the opposite direction that the pedal arms are rotating. This operation causes a net rotation of the adjustor shafts 104 to shorten the stroke (e.g., collapse the pedal arm assembly 100). It is noted that in the neutral position the cam is free (e.g., not contacting the adjustor sync shaft).

Returning to FIG. 3A, left and right shift stoppers 136 (e.g., for clarity, only the right shift stopper is shown) are shown for making shifting easier.

While the adjustor sync shaft 120 is rotating relative to the pedal arms 103, the pin 139 (e.g., which is inserted through the free hole in the shift stopper) for sensing an alignment function and which protrudes from the pedal arm cap 137 causes the wheel 140 at the end of the shift stopper 136 to turn relative to the adjustor sync shaft 120. The shift stopper 136 is threaded, as is the adjustor sync shaft 120 (e.g., at this point along the shaft 120) so that when the adjustor sync shaft 120 is turning relative to the pedal arms 103, the shift stoppers 136 are both moving right or left.

When the right shift stopper 136 moves far enough (e.g., a predetermined distance) to the left, it engages and, ultimately, lifts the shifter cam 135 away from the sync gear 140 which disengages the shifting action. This prevents the rider from holding the shifting lever (e.g., not shown) in the up or down position for too long a time period. If the shifting action is engaged beyond the maximum extent of the telescoping pedal arm 103, the system would otherwise bind (e.g., "lockup"). It is noted that the drive shaft is continuous and moves the pivot gear when the pivot gear engages the sync gear 140.

Thus, with the invention, in operation, at low speeds (e.g., "low speed" depending on the operator), the cranks are fully extended, and there is maximum leverage for climbing hills and initial pedaling. At higher speeds, the stroke length can be shortened so that minimal leg motions can be used to continue to apply accelerative force to the drive wheel(s).

When the rider engages the "up" cog (e.g., by pulling a simple lever attached to a cable or the like), a planetary gear in the pedal crank hub shifts into place which turns an internal shaft which screws the pedal arm into a shortened position. Likewise, engaging the "down" cog (e.g., by moving the simple lever in the opposite direction or the like), the internal shaft screws the pedal arm into a lengthened position.

Both changes are driven by rotations of the pedal arm assembly (e.g., pedal-powered shifting). The pedal arms are connected together in the hub so that they will extend or shorten in parallel fashion.

Further, it is noted that an automatic shifting mechanism could be employed similarly to a flywheel, in which a cable moves up and down. Further, a centrifugal governor could be used in which the shifter cam is adjusted by a centrifugal governor moving relatively fast or relatively slow.

Thus, with the unique and unobvious features of the invention, a real-time, continuous adjustability to the stroke length of the pedal crank can be provided, regardless of low speeds or high speeds of the bicycle.

Second Embodiment

A second preferred embodiment is directed to an air pump. In the second embodiment, a variable stroke-length apparatus enables the pump to work efficiently for both high-pressure/low volume applications (e.g., such as to inflate a tire) and low-pressure/high-volume applications (e.g., such as to inflate a boat, air mattress or toy pool).

In high-pressure applications, the piston moves a short distance and must be close to the end of the piston cylinder in order to avoid thrashing. That is, air is elastic, and if there is too much air volume in the cylinder during reciprocal cycles, then the air will tend to just compress and expand instead of being forced out of the cylinder against the pressure of the receiving device (tire).

In low-pressure, high-volume applications, it is desirable that the piston move up and down the full length of the cylinder. It is noted that during the initial pumping, even high-pressure applications are, in effect low-pressure applications. That is, until some pressure is achieved in the receiving device, the device continuously adjusts to provide optimum stroke volume at any point during the pumping.

Figure 5:
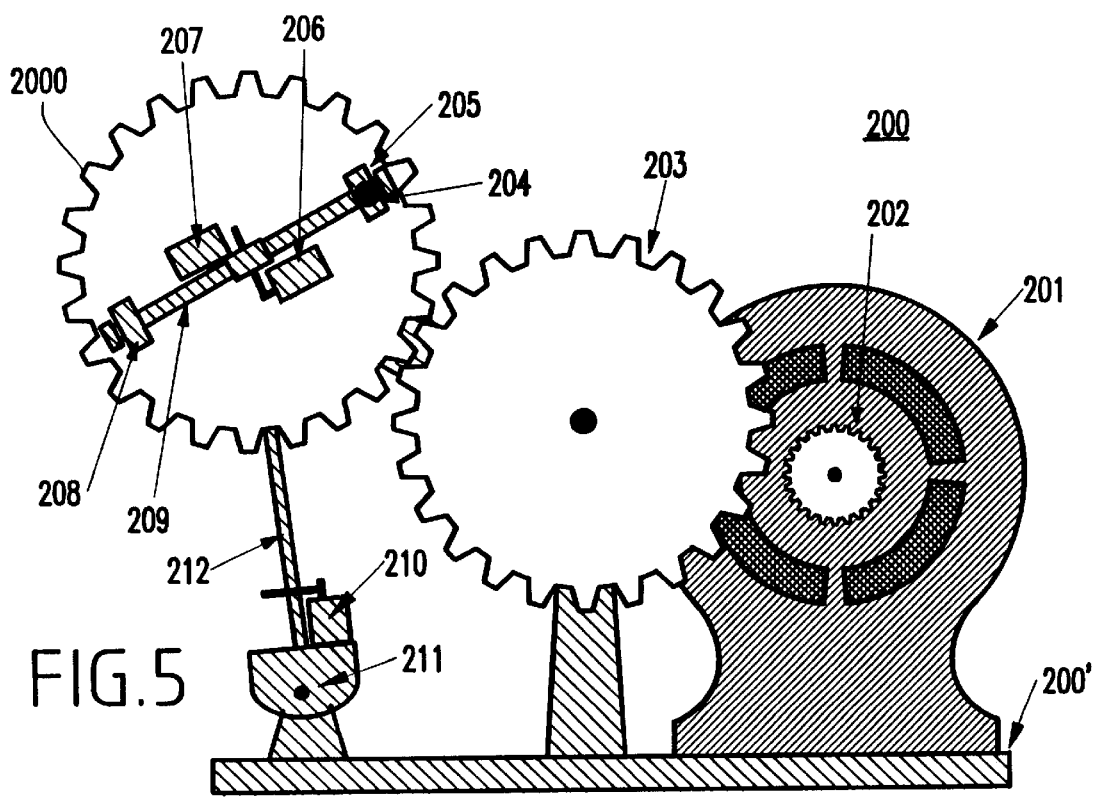
FIG. 5 is a schematic view of an assembly according to the invention for use with an air pump.

Referring to FIG. 5, an air pump 200 is shown. The air pump includes a base 200', a motor 201, a drive gear 202, a stationary gear 203, a cam 204, a cam mounting 205, a length-adjusting stepper motor 206, counterweights 207, 208, an adjuster shaft 209, a height-adjusting stepper motor 210, a swivel joint 211, and a pivot gear adjuster rod 212.

In the air pump 200, the motor 201 turns the drive gear 202 which turns the stationary gear 203 which turns a pivoting gear 2000. The pivoting gear 2000 pivots on an arm (e.g., not shown-hidden behind the pivoting gear) about the axis of rotation of the stationary gear 203.

The pivoting gear is moved up and down by the threaded pivot gear adjuster rod 212, which is driven by the height-adjusting stepper motor 210. The adjustor rod and motor are mounted on the swivel joint 211. The pivoting gear has, on its face, a variable-length stroke arm mechanism which is formed by elements 204–209.

When the length adjusting stepper motor 206 turns, it rotates the adjuster shaft 209 which causes the threaded cam mounting 205 to move away from or toward the center of rotation. Attached to the cam mounting is the cam 204 which will engage the piston shaft cam slot (described below with reference to FIG. 6). Counterweights 208, 207 keep the pivoting gear balanced for smooth rotations.

Figure 6:
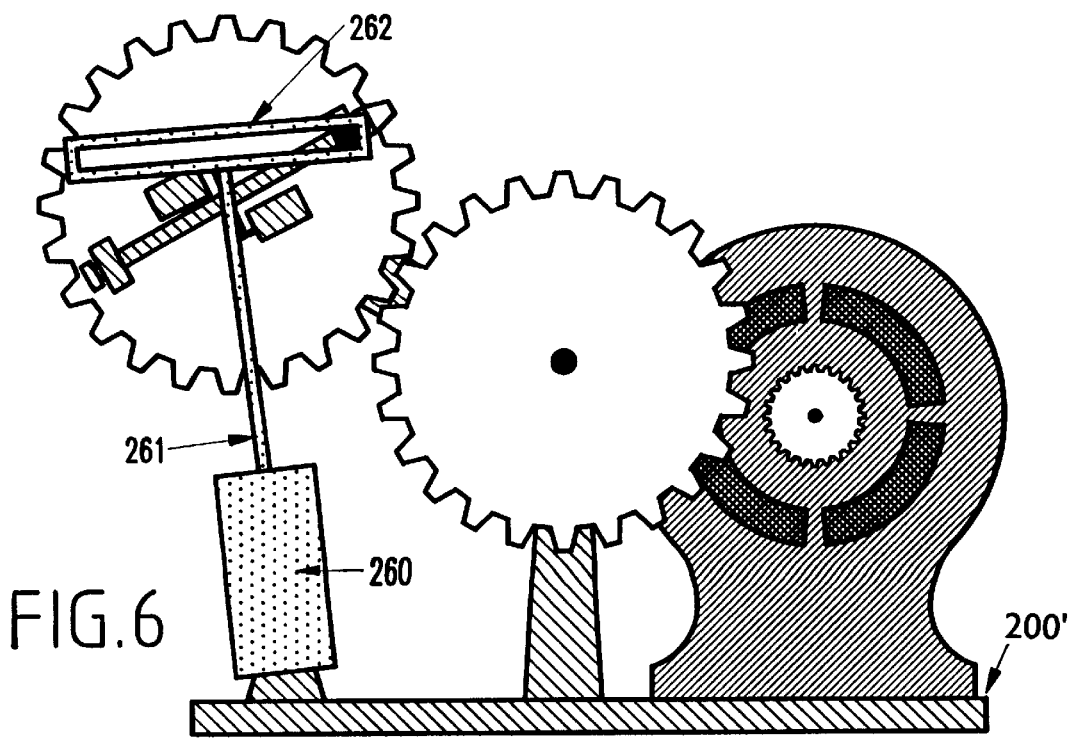
FIG. 6 is a schematic view of the assembly of FIG. 5 in which a cylinder with its shaft and piston shaft cam slot which is engaged with the cam shown in FIG. 5.

Referring to FIG. 6, it is shown that a cylinder 260 with its shaft 261 and piston shaft cam slot 262 which is engaged with the cam 204 described above in relation to FIG. 5.

It is noted that both stepper motors 206, 210 operate in tandem, governed by a circuit (not shown) which measures the RPMs of the motor. As the demands of the system increase (i.e., as the pressure being pumped against increases such as when a tire gets near full), the load on the motor causes the RPMs of the motor to drop below the optimum rpm level.

When the RPMs fall below the nominal value, power is applied to the stepper motors to simultaneously shorten the stroke length of the variable length stroke arm mechanism on the face of the pivoting gear, and to lower the pivoting gear so that it is closer to the cylinder 260, thereby moving the piston closer to the end of the cylinder 260.

If the RPMs increase beyond the nominal value, this indicates "free-wheeling" (i.e., not much load on the motor), which causes the circuit to engage the stepper motors 206, 210 in the opposite direction to increase the stroke length, causing the piston to use more of the available volume of the cylinder 260 with each stroke.

Thus, in the second preferred embodiment of the present invention, a real-time, continuous adjustability to the stroke length of the cylinder can be provided, regardless of low speeds or high speeds of the air pump.

While the invention has been described in terms of preferred embodiments, those skilled in the art will recognize that the invention can be practiced with modification within the spirit and scope of the appended claims.

For example, a unique advantage of the present invention is that the structure provided therein has unique application not only to two-wheeled (or more) cycles, but also to affect a "gear ratio" to shift unicycles.

Further, while the non-limiting, exemplary application discussed above has been in the area of bicycles and air pumps, the invention would be relevant and useful to any mechanical system in which the stroke length of a reciprocating crank arms is adjustable. For example, the invention could be employed with reciprocating engines.

Additionally, instead of an automatic adjustable stroke length based on pressure or the like for a pump, a mechanism could be provided including a plurality of detents. Such detents could be manually set to adjust the stroke/speed of moving, thereby to accommodate the inflation of a tire (e.g., high pressure) or an air mattress.

What is claimed is:

1. An adjustable crank pedal apparatus, comprising:
   at least one pedal crank;
   a pedal arm assembly, coupled to the at least one pedal crank, for telescoping to a length;
   an actuating mechanism, coupled to said pedal arm assembly, for lengthening and shortening the length of said at least one pedal crank, to selectively and controllably adjust a stroke length of said at least one pedal crank,
   a second adjustor shaft for a second pedal arm assembly, wherein said pedal arm assembly comprises a first pedal arm assembly including a first adjustor shaft;
   an adjustor sync shaft for linking together said first and second adjustor shafts of the first and second pedal arm assemblies, such that the first and second pedal arm assemblies turn to lengthen or shorten the stroke of the at least one pedal crank in unison,
   wherein said actuating mechanism includes a crank tube assembly having a crank tube for linking together said first and second pedal arm assemblies via a drive shaft in said crank tube such that said first and second pedal arm assemblies rotate in unison and adjust said stroke length,
   wherein pedal arms of said first and second pedal assemblies are linked by the drive shaft, and rotate at a same rate as the adjustor style sync shaft such that substantially no rotational force is applied against the adjustor shafts and such that the stroke length remains constant, and
   wherein said crank tube assembly includes:
      a shifter cam;
      a pivot gear mounted on said shifter cam; and
      a sync gear fixed on the adjustor sync shaft,
      wherein, responsive to actuation of an external cable, the shifter cam engages said sync gear.

2. The apparatus according to claim 1, said pedal arm assembly including:
   an inner pedal arm;
   a pedal mounted on said inner pedal arm; and
   a nut, housed within said inner pedal arm, for engaging said adjustor shaft,
   wherein the adjustor shaft turns against the nut in the inner pedal arm to lengthen or shorten the stroke length, and wherein said adjustor shaft is constrained by said nut.

3. The apparatus according to claim 2, said shifter cam further comprising:

a drive gear mounted on said drive shaft; and a screw for mounting said drive.

4. The apparatus according to claim 1, wherein when the shifter cam is pulled in a predetermined direction, the pivot gear engages the sync gear, thereby causing the adjustor sync shaft to rotate relative to the pedal arms, in a same direction that the pedal arms are rotating, such that a net rotation of the adjustor shaft lengthens the stroke of the pedal arm assembly.

5. The apparatus according to claim 1, wherein when the shifter cam is actuated in a predetermined direction, said shifter cam engages the sync gear, and the sync gear stops rotating, such that the adjustor sync shaft is caused to rotate relative to the pedal arms in a direction opposite that the pedal arms are rotating and such that a net rotation of the adjustor shaft shortens the stroke.

6. The apparatus according to claim 1, further comprising:

first and second shift stoppers, wherein while the adjustor sync shaft is rotating relative to the pedal arms, the first and second shift stoppers are both moving in a first direction or a second direction, wherein, when the first shift stopper moves to a predetermined distance to the second direction, said first shift stopper engages and lifts the shifter cam away from the sync gear.

7. The apparatus according to claim 1, further including a drive wheel coupled to receive force from said at least one pedal crank, wherein at predetermined low speeds, a stroke length of said at least one pedal crank is fully extended, to provide maximum leverage, and wherein at predetermined higher speeds the stroke length is shortened so that minimal leverage is used to continue to apply accelerative force to the drive wheel.

8. The apparatus of claim 1, wherein both of the lengths of said first and second pedal arm assemblies are equal though their angular rotation.

9. The apparatus of claim 8, wherein said sync gear actuates the lengthening and shortening of the pedal arm assemblies.

* * * * *